(12) United States Patent  
Krishnamurthy et al.

(10) Patent No.: US 8,419,835 B2  
(45) Date of Patent: Apr. 16, 2013

(54) APPARATUSES AND METHODS FOR GAS-SOLID SEPARATIONS USING CYCLONES

(75) Inventors: Sujay Krishnamurthy, Hoffman Estates, IL (US); William Koves, Hoffman Estates, IL (US)

(73) Assignee: UOP LLC, Des Plaines, IL (US)

( * ) Notice: Subject to any disclaimer, the term of this patent is extended or adjusted under 35 U.S.C. 154(b) by 337 days.

(21) Appl. No.: 12/853,891

(22) Filed: Aug. 10, 2010

(65) Prior Publication Data

US 2012/0037000 A1 Feb. 16, 2012

(51) Int. Cl.
*B01D 45/12* (2006.01)

(52) U.S. Cl.
USPC ............ 95/269; 95/271; 55/343; 55/346; 55/348; 55/347; 55/456; 55/457; 55/418; 55/349; 55/459.1

(58) Field of Classification Search ........... 55/343, 55/346, 348, 347, 456, 457, 418, 349, 459.1; 95/269, 271; 422/147, 169, 187; 423/215.5; 60/648, 783
See application file for complete search history.

(56) References Cited

U.S. PATENT DOCUMENTS

| | | | |
|---|---|---|---|
| 2,667,944 A * | 2/1954 | Crites | ............... 55/422 |
| 2,986,278 A | 5/1961 | Bjorklund | |
| 4,003,822 A | 1/1977 | Jo | |
| 4,138,219 A | 2/1979 | Colvert et al. | |
| 5,464,528 A | 11/1995 | Owen et al. | |
| 5,538,696 A | 7/1996 | Raterman et al. | |
| 5,690,709 A | 11/1997 | Barnes | |
| 5,914,433 A | 6/1999 | Marker | |
| 6,023,005 A | 2/2000 | Lattner et al. | |
| 6,166,282 A | 12/2000 | Miller | |
| 6,245,703 B1 | 6/2001 | Kuechler et al. | |
| 6,673,133 B2 | 1/2004 | Sechrist et al. | |
| 6,797,026 B2 | 9/2004 | Sechrist et al. | |
| 6,902,593 B2 | 6/2005 | Miller et al. | |
| 7,048,782 B1 | 5/2006 | Couch et al. | |

(Continued)

FOREIGN PATENT DOCUMENTS

| WO | 0041986 | 7/2000 |
|---|---|---|
| WO | 03066225 | 8/2003 |

OTHER PUBLICATIONS

Ye-Mon Chen; Shell third stage separator technology: Evolution and recent advances in third stage separator technology for applications in the FCC process; Source: NPRA Annual Meeting Technical Papers 2006 2006 p. 8, 2006 NPRA Annual Meeting, 2006, Salt Lake City, UT National Petroleum Refiners Association.

(Continued)

*Primary Examiner* — Jason M Greene
*Assistant Examiner* — Dung H Bui
(74) *Attorney, Agent, or Firm* — James C Paschall

(57) ABSTRACT

Cyclones for gas-solid separators are described, which are especially applicable for use in a downflowing third stage separator (TSS) for the removal of dust particles, such as solid catalyst fines, from the flue gas streams exiting the catalyst regenerator in fluid catalytic cracking (FCC) processes. A number of important flow characteristics result from the configuration of the cyclones, particularly with respect to the relative axial lengths over which swirl vanes and central hubs of the cyclones extend. These characteristics include a decrease in growth of turbulent eddies that conventionally result from a sudden expansion, in open cross-sectional area, of gas exiting swirl vanes.

19 Claims, 2 Drawing Sheets

U.S. PATENT DOCUMENTS 7,214,636 B2 5/2007 Beech, Jr. et al.
7,316,733 B1 1/2008 Hedrick et al.
7,547,427 B2 6/2009 Walker et al.

OTHER PUBLICATIONS

H.W. Dries et al.; New advances in third-stage separators; Source: World Refining 10(8) 2000 p. 30-32, 34.

Ye-Mon Chen; Recent Advances in FCC technology; Source: AIChE Annual Meeting, Conference Proceedings, p. 2771-2783, 2004, 2004 AIChE Annual Meeting, Conference Proceedings; Author Affiliation: Shell Global Solutions (US) Inc., Conference: 2004 AIChE Annual Meeting, Nov. 7-12, 2004; Publisher: American Institute of Chemical Engineers.

F.H.H. Khouw et al.; The Shell Residue Fluid Catalytic Cracking Process Commercial Experience and Furture Developments; Source: 1990 NPRA Annual Meeting, Mar. 25, 1990-Mar. 27, 1990, San Antonio, Texas; total 38 pages.

\* cited by examiner

APPARATUSES AND METHODS FOR GAS-SOLID SEPARATIONS USING CYCLONES

FIELD OF THE INVENTION

The invention relates to apparatuses and methods for gas-solid separation and particularly for the separation of gas effluents from fluidized particle beds, including those used for catalytic reactions and catalyst regenerations involving solid catalysts. The invention more particularly relates to cyclone separators used in gas-solid separations.

DESCRIPTION OF RELATED ART

Fluidized beds are currently used extensively in major industries including oil refining, petrochemical production, coal and mineral beneficiation, metallurgical applications, food processing, etc. Fluidized beds of solid particles, and particularly those operating in the bubbling regime, advantageously provide very uniform gas-solid contacting conditions due to thorough mixing. Fluidization generally causes not only local mixing but also large-scale circulation within the bed. These benefits of solid particle fluidization, however, are not without consequences. The most significant of these is the entrainment (elutriation or carryover) of solid particles due to the passage of gas bubbles through the dense phase of the fluidized solid particle bed and breakage of these bubbles at the surface of the dense phase. The bursting action of the bubbles throws large amounts of the particulate solids into the dilute phase directly above the dense phase. This in turn causes entrainment of particles having a sufficiently small diameter, namely such that their terminal velocity (which decreases with decreasing particle size) is below the superficial velocity of the rising gas.

Particular fluidized bed systems of practical interest in the refining and petrochemical fields include those used in catalytic conversions in the presence of a solid particulate catalyst. The use of fluidized beds of catalyst is favorable, for example, in conversion processes in which catalyst deactivation, due to the accumulation of carbonaceous deposits (coke) during the course of the conversion, occurs rapidly. In such cases, deactivated catalyst from a reaction zone must be passed to a regeneration zone for removal of the accumulated deposits by combustion, followed by return of the regenerated catalyst back to the reaction zone. Fluidized beds of catalyst in both the catalytic reactor and catalyst regenerator allow for continuous circulation of spent (coked) and regenerated catalyst between these apparatuses.

One example of a refining process utilizing fluidized bed reaction and regeneration zones is fluid catalytic cracking (FCC), which is described, for example, in U.S. Pat. No. 4,003,822 and elsewhere. FCC is applicable for the conversion relatively high boiling or heavy hydrocarbon fractions, such as crude oil atmospheric and vacuum column residues and gas oils, to produce more valuable, lighter hydrocarbons and particularly those in the gasoline boiling range. The high boiling feedstock is contacted in one or more reaction zones with a particulate cracking catalyst that is maintained in a fluidized state, under conditions suitable for carrying out the desired cracking reactions. In the fluidized contacting or reaction zone, carbonaceous and other fouling materials are deposited on the solid catalyst as coke, which reduces catalyst activity. The catalyst is therefore normally conveyed continuously to another section, namely a rejuvenation or regeneration zone, where the coke is removed by combustion with an oxygen-containing regeneration gas. The resulting regenerated catalyst is, in turn, continuously withdrawn and reintroduced in whole or in part to the reaction zone.

More recently, fluidized bed systems have been applied in the production of light olefins, particularly ethylene and propylene, which are valuable precursors for polymer production. The light olefins are desirably obtained from non-petroleum based feeds comprising oxygenates such as alcohols and, more particularly, methanol, ethanol, and higher alcohols or their derivatives. Methanol, in particular, is useful in a methanol-to-olefin (MTO) conversion process described, for example, in U.S. Pat. No. 5,914,433 and U.S. Pat. No. 6,245,703. These patents and others teach the use of a fluidized bed reactor with continuous circulation of spent catalyst from the reactor to a regenerator. The regenerator can similarly contain a fluidized bed of solid catalyst particles for carrying out the regeneration by the combustion of deposited coke.

In processes such as FCC and MTO, the use of fluidized particle beds in the reaction and regeneration zones leads to entrainment of solids into the gaseous effluents from these zones. In the case of the reaction zone, catalyst particles can exit with the reactor effluent, containing the desired reaction products (e.g., gasoline boiling range hydrocarbons in the case of FCC or light olefins in the case of MTO). Likewise, catalyst particles may similarly become entrained in the combustion gases exiting the catalyst regenerator (e.g., containing nitrogen, $CO_2$, CO, and $H_2O$). Catalyst fines contained in the regenerator flue gas effluent are known to interfere with downstream power generation equipment such as the expander. In general, the losses of entrained catalyst from a fluidized bed, for example either a catalytic reactor or catalyst regenerator, result in increased costs, particularly on an industrial scale. This is especially true considering the high cost of the zeolite-containing catalysts and the non-zeolitic molecular sieve catalysts (e.g., silicoaluminophosphates or SAPOs) used currently used in FCC and MTO, respectively.

In order to minimize losses of entrained catalyst particles, a number of gas-solid separators have been proposed for use in disengagement or separation zones, located above the dense bed phase, in reactors and regenerators having fluidized solid catalyst beds. These separators, including cyclones, filters, screens, impingement devices, plates, cones and other equipment, have been used with varying success. Cyclone separators have gained widespread use in both FCC and MTO, as described, for example, in U.S. Pat. No. 4,138,219 and by Khouw et al., (NATIONAL PETROLEUM REFINERS ASSOCIATION, 1990 Annual Meeting, Mar. 25-27, 1990) with respect to FCC and in U.S. Pat. No. 7,214,636, U.S. Pat. No. 6,023,005, U.S. Pat. No. 6,166,282, and WO 00/41986 with respect to MTO. Cyclone separators have been applied in both the catalytic reactors and catalyst regenerators of these conversion processes.

Refiners have also used a cyclone-containing third stage separator (TSS), external to the catalyst regenerator, to remove catalyst fines from the FCC regenerator flue gas (i.e., the combustion gas exiting the regenerator). These devices have typically been used in power recovery installations to protect expander blades. In the TSS, flue gas from the FCC catalyst regenerator is passed through a number of high efficiency cyclonic elements arranged in parallel and contained within the TSS vessel. The flue gas enters the vessel through a flow distributor that evenly distributes the gas to the individual cyclone elements. After catalyst particulates are separated from the flue gas in the cyclones, the clean flue gas leaves the separator. The solid particulates are concentrated in a small stream of gas, called the underflow gas, which exits the bottom of the TSS.

Invariably, cyclones and other separation devices promote catalyst attrition and equipment (e.g., metal) erosion due to the high velocity of gases used and the interaction between these gases, containing entrained solid particles, and the walls of these devices. Attrition results in the formation of catalyst fines that are not easily separated and tend to cause operating difficulties (e.g., plugging) in equipment, for example that associated with the reaction and/or regeneration zones. Erosion leads to a reduction in equipment life and/or increased costs due to maintenance and downtime. There is therefore an ongoing need in the art for apparatuses and methods that promote the desired separation of solids (e.g., catalyst particles), from gases, (e.g., reactor and regenerator effluents), into which these solid particles are entrained. There is particularly a need for such apparatuses and methods in which particle separation efficiency is improved and/or particle fines generation is decreased.

SUMMARY OF THE INVENTION

The present invention is associated with the discovery of apparatuses and methods for the separation of solid particles from gas streams contaminated with these particles. Aspects of the invention particularly relate to such apparatuses and methods, in which particle attrition and/or metal erosion are reduced, and/or separation efficiency increased, compared to conventional gas-solid separation methods. These advantages result from the use of a cyclone, or a plurality of cyclones, having features as described in greater detail below.

Particular applications of apparatuses and methods of the present invention are in cyclone separations of catalytic reactor or catalyst regenerator effluent gases containing solid catalyst particles, and especially those applications known to be presently carried out using an external third stage separator (TSS) to clean the particle-containing effluent gas (i.e., combustion product gas) from a fluid catalytic cracking (FCC) catalyst regenerator, often after undergoing initial stages of cyclone separation within the regenerator. Due to these initial stages (e.g., first and second stages) of separation, solids in the effluent of the FCC catalyst regenerator, which can serve as a feed gas stream in apparatuses and methods according to the present invention, are typically in the form of fine dust. For example, the average size of solid particles, namely catalyst fines, in this gas stream is generally in the range from about 1 micron ($\mu m$) to about 75 $\mu m$, and often in the range from about 5 $\mu m$ to about 50 $\mu m$. The high gas velocities required to "de-dust" the FCC catalyst regenerator flue gas has given rise to concerns of equipment (metal) erosion, as discussed above.

Although particularly applicable for use in TSS apparatuses external to an FCC catalyst regenerator, the apparatuses and methods described herein are broadly applicable to gas-solid separators having one or a plurality of cyclones that may be used in any number of industrial applications, and especially in fluidized bed applications in which solid particles tend to become entrained in gases exiting the dense bed phase and are desirably removed. Examples include gas effluent streams from fluidized catalyst beds used in the catalyst reaction zone and/or catalyst regeneration zone of FCC or methanol to olefins (MTO) processes. The cyclones may be used in a vessel external to a reactor or regenerator vessel that contains a disengagement or separation zone above a dense fluidized bed zone. Such external vessels, in contrast to the reactor or regenerator vessel, are normally configured for flow of the solid particle containing feed gas in the downward direction.

Embodiments of the invention are directed to a cyclone for a gas-solid separator. The cyclone comprises a hollow barrel, which is generally cylindrical and extends axially within the separator. A central hub, also extending axially and usually solid (i.e., not hollow), is disposed within the barrel, for example concentrically, to provide an axially extending annular section between the outer diameter of the central hub and the inner diameter of the barrel. Swirl vanes extend radially into the annular section, advantageously over an axial length of at most about 75% of the axial length of the central hub. In particular embodiments, the axial length over which the swirl vanes extend into the annular section is at most about 50% of the axial length of the central hub. For example, the swirl vanes may extend solely in an upper half of the axial length of the central hub.

The extension of the swirl vanes over only a portion of the axial length of central hub results in performance advantages of the cyclone, based on computational fluid dynamics (CFD) modeling studies. These studies show that the desired swirling gas flow, which forces the high density particles to the barrel wall, is well established even if the swirl vane section is considerably shortened relative to the length of the central hub. Importantly, using this configuration, an abrupt expansion in cross-sectional area at the swirl vane exit, which occurs when the swirl vane exit coincides with the bottom of the central hub, is avoided. The size of turbulent eddies, now forming in the part of the annular section that is between the central hub and barrel, in the absence of the swirl vanes, is decreased. This in turn reduces erosion of the inner walls of the barrel due to the combined effect of the presence of dust particles and turbulent eddies. Particle attrition is also reduced. These considerations are important, in view of the detrimental effects of (i) equipment erosion, which can force premature shutdowns of complex refining and petrochemical processes, and (ii) particle attrition, which can adversely affect gas-solid separation efficiency. Moreover, by overcoming the abrupt change in geometry associated with extending the swirl vanes over substantially the same axial length as that of the central hub, radially inward acceleration of gas flow streamlines from the outside wall of the central hub toward the axis or centerline of the barrel is reduced or eliminated, thereby maintaining the desired swirl of the gas flow and decreasing particle entrainment into the purified gas outlet at the center of the barrel.

Further particular embodiments of the invention are directed to cyclones as described above, in which the central hub has a lower, tapered section (e.g., in the form of a conical end cap). Generally, the swirl vanes extend over a portion of the axial length of an upper, non-tapered section of the central hub, but not over any portion of the axial length of the tapered section. The use of a tapered section further allows for a smooth transition of downwardly flowing gas from the annular section to the purified gas outlet of the cyclone. The tendency of the gas to "squeeze" radially inward and cause turbulence is therefore reduced, resulting in reduced solid entrainment into the purified gas outlet.

Other embodiments of the invention are directed to a gas-solid separator, such as a third stage separator (TSS) comprising an upper tube sheet, a lower tube sheet, and at least one cyclone extending through the tube sheets. The cyclone has an impure gas inlet at an upper end of a barrel, extending above the upper tube sheet; a solid particle outlet at a lower end of the barrel between the upper tube sheet and the lower tube sheet; and a purified gas outlet extending below the lower tube sheet. The cyclone comprises the features described above. Preferably, the gas-solid separator comprises a plurality of such cyclones (e.g., from about 5 to about 300 cyclones, depending on the particular application).

Yet further embodiments of the invention are directed to a process for purifying a gas stream contaminated with solid particles. The process comprises feeding the gas stream to a process gas inlet of the gas-solid separator having a plurality of cyclones comprising the features described above. The process gas inlet is in communication with the impure gas inlets of the plurality of cyclones. The process further comprises withdrawing an underflow gas stream from a particle-rich gas outlet in communication with the solid particle outlets of the plurality of cyclones; and withdrawing a clean gas stream from a particle-lean gas outlet in communication with the purified gas outlets of the plurality of cyclones. As discussed above, a representative gas stream is an effluent from a catalytic reaction zone or a catalyst regeneration zone of an FCC process or an MTO process.

These and other aspects and embodiments associated with the present invention are apparent from the following Detailed Description.

BRIEF DESCRIPTION OF THE DRAWINGS

FIGS. 1 and 2 should be understood to present an illustration of the invention and/or principles involved. Various features are depicted to facilitate explanation and understanding. As is readily apparent to one of skill in the art having knowledge of the present disclosure, apparatuses and methods for performing gas-solid separations will have configurations and components determined, in part, by their specific use.

DETAILED DESCRIPTION

The invention is associated with cyclones for gas-solid separators. The cyclones are especially applicable for use in a downflowing (or so-called "uniflow") third stage separator (TSS) for the removal of dust particles, such as solid catalyst fines, from the flue gas streams exiting the catalyst regenerator in fluid catalytic cracking (FCC) processes. The cyclones, however, are also broadly applicable to the removal of solid particles from gas streams in any number of applications where such removal is desired, particularly with respect to gas effluent streams from fluidized bed processes such as catalytic reactions and catalyst regenerations. Exemplary process streams are those encountered in FCC as well as methanol to olefins (MTO) processes, as described above.

Figure 1:
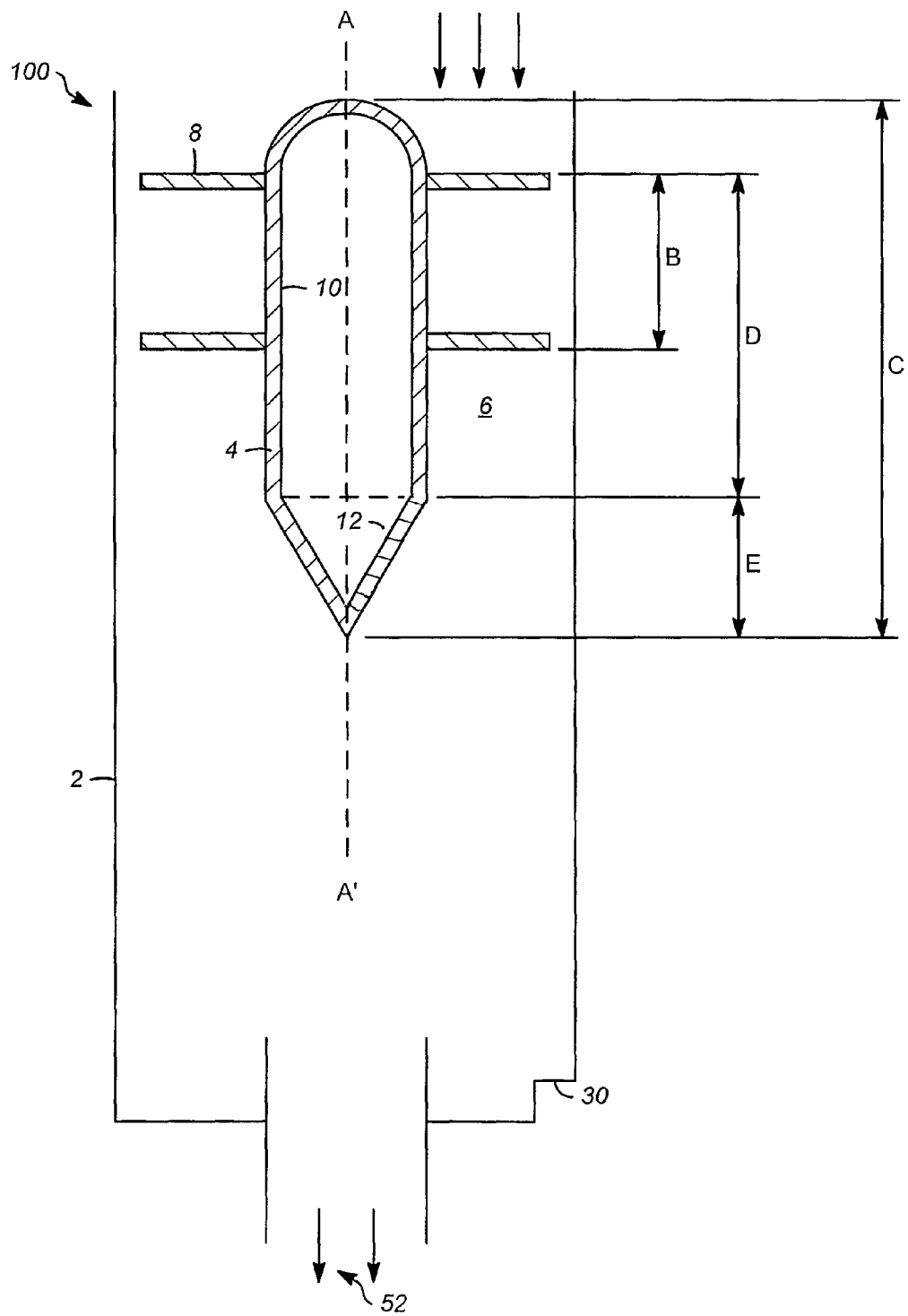
FIG. 1 is a side cut-out view taken along the axis of a representative cyclone as described herein.

A representative cyclone 100 is depicted in FIG. 1 and includes a barrel 2 that is normally cylindrical in shape and extends axially. A central hub 4 is disposed within the hollow barrel 2, in this case (but not necessarily) in a concentric manner such that axis A-A' of central hub 4 and barrel 2 are aligned to provide a symmetrical flow geometry. Central hub 4 may have either a solid or a hollow configuration. Because both central hub 4 and barrel 2 extend axially, an axially extending annular section 6 is provided in the space between these elements of cyclone 100. In particular, annular section 6 is between the outer diameter of central hub 4 and the inner diameter of barrel 2. Swirl vanes 8, which may be helical or in the form of concentric, flat plates in parallel planes, extend radially into a portion of annular section 6. In the case of helical swirl vanes, it is understood that a single vane may be used, extending circumferentially around central hub 4 and also extending gradually in an axial direction (i.e., having an axial "pitch"), to thereby extend over swirl vane axial length B.

As discussed above, a number of important flow characteristics result from the configuration of cyclone 100, particularly with respect to the relative axial lengths over which swirl vanes 8 and central hub 4 extend. These characteristics include a decrease in growth of turbulent eddies that conventionally result from a sudden expansion, in open cross-sectional area, of gas exiting swirl vanes 8. Since turbulence is decreased at the gas exit from swirl vanes 8, solid particles forced to the wall of barrel 2, by centrifugal forces induced by the swirling gas, remain at this wall even at downstream axial locations remote from swirl vanes 8. This promotes an efficient gas-solid separation. To achieve these and other desired flow characteristics, the swirl vane axial length B (or axial length over which the swirl vanes extend), is generally at most about 75%, and often at most about 50%, of the central hub axial length C (or axial length over which the hub extends).

In many cases the swirl vane axial length B is entirely in an upper half of the central hub axial length C. The terms "upper" and "lower," are used herein merely to reference relative axial heights when cyclone 100 is positioned for its normal downflow operation (i.e., with gas flowing from the "upper" part to the "lower" part of cyclone 100). The terms are not meant to require the cyclone to be oriented in any particular position. As shown in FIG. 1, central hub 4 has both an upper, non-tapered section 10 and a lower, tapered section 12. Upper, non-tapered section 10 may be a cylindrical section, while lower, tapered section 12 may be, for example, in the form of a conical end cap. In other embodiments of the invention, as discussed above relative to the total central hub axial length C, the swirl vane axial length B may be at most about 75%, or even at most about 50% of the non-tapered section axial length D (or axial length over which non-tapered section 10 extends). The swirl vane axial length B may also be entirely in an upper half of non-tapered section axial length D. Generally, tapered section axial length E (or axial length over which tapered section 12 extends) is less than, and often less than about 50% of, non-tapered section axial length D. Swirl vanes 8, as shown in FIG. 1, therefore normally extend over all or a portion of non-tapered section axial length D, but not over any portion of tapered section axial length E.

Solid particle outlet 30 at periphery of barrel 2 is designed for removal of concentrated solids, in an underflow gas, which are forced to this radial periphery by centrifugal forces established in downwardly-flowing, swirling gas. Solid particle outlet 30 may be in the form of one or more openings (e.g., slots or holes) in the side of barrel 2 or at its lower end. Purified gas outlet 52, concentric with barrel 2, is designed for removal of a clean gas having a greatly reduced solids concentration, relative to the underflow gas.

Figure 2:
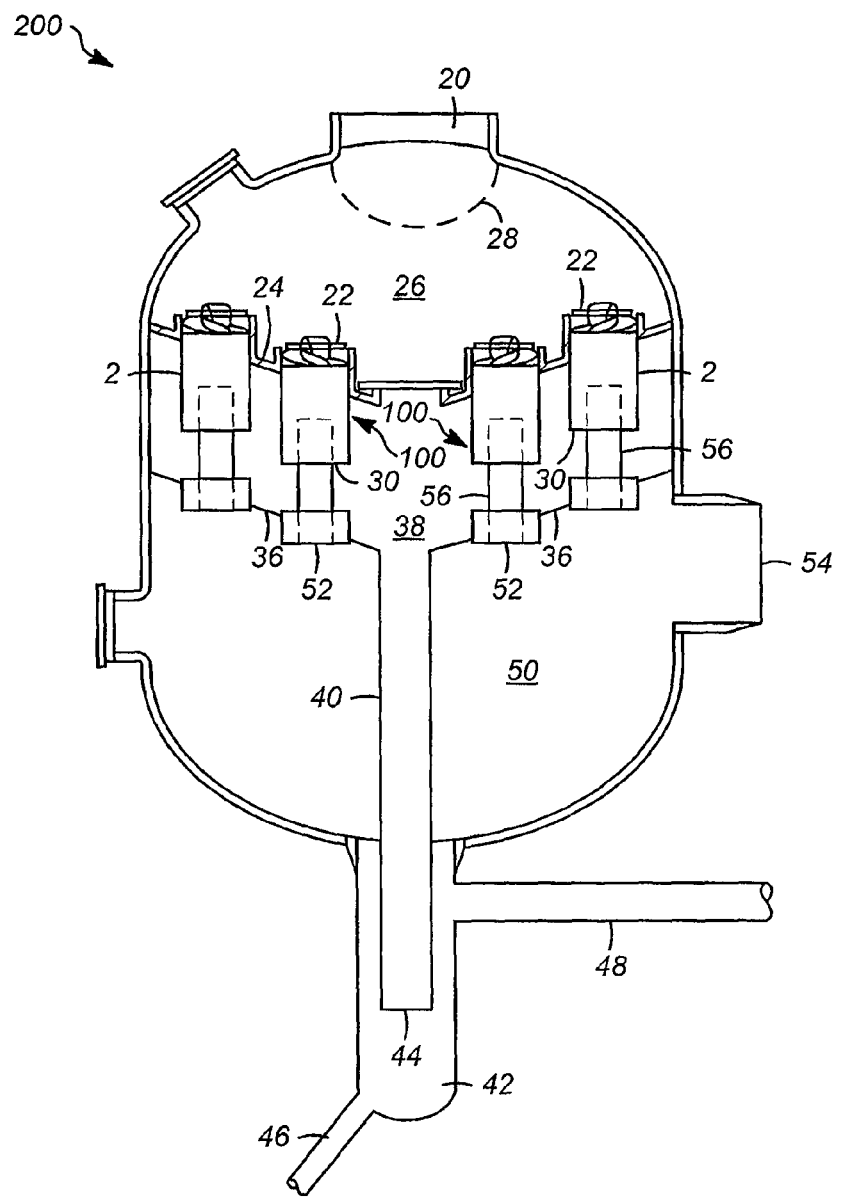
FIG. 2 is a side cut-out view taken along the axis of a solid-gas separator having a plurality of cyclones as shown in FIG. 1.

FIG. 2 depicts a gas-solid separator 200 such as a TSS, discussed above, having a plurality of cyclones 100 as described herein. While only four cyclones 100 are represented in FIG. 2, between about 5 and 300 cyclones, and often between about 10 and about 200 cyclones, may be used depending on the particular gas-sold separation operation. In operation, a gas stream is fed to gas-solid separator 200 through process gas inlet 20, which communicates with impure gas inlets 22 at upper ends of barrels 2 of the plurality of cyclones 100. Impure gas inlets 22 extend above upper tube sheet 24. Upper tube sheet 24 at least partially defines an inlet chamber 26 that limits communication between this chamber and the rest of gas-solid separator 200. The gas stream entering separator 200 may be distributed via a diffuser 28 to process gas inlets 22 of the plurality of cyclones 100 containing swirl vanes (8 in FIG. 1). These swirl vanes are configured in the manner discussed above with respect to FIG. 1 and restrict the gas stream flow path, thereby accelerating the flowing gas. The swirl vanes also impart a helical or spiral motion to the flowing gas, which forces the higher-density solids toward the wall of barrels 2 of cyclones 100. Solid particles directed to the swirl periphery in this manner fall through solid particle outlets 30 of cyclones 100. Solid particle outlets 30, at lower ends of barrels 2, extend to positions located between upper tube sheet 24 and a lower tube sheet 36. A solids chamber 38 is therefore defined between these tube sheets 24, 36.

An underflow gas stream is withdrawn from a particle-rich gas outlet 44 in communication with solid particle outlets 30 of the plurality of cyclones 100. Particle-rich gas outlet 44 is at a lower end of solids outlet tube 40, extending from the solids chamber 38 into a collection vessel 42. Solids outlet tube 40 therefore transports solids collected on the lower tube sheet 36 into this collection vessel 42. A high percentage of the solid particles contained in the total gas fed to the gas-solid separator 200, generally at least about 95% by weight, typically at least about 98% by weight, and often at least about 99% by weight, is transferred out of this vessel via solids outlet tube 40.

Underflow gas is therefore the portion, typically from about 1% to about 10% by volume, and often from about 3% to about 5% by volume, of the total gas fed to the gas-solid separator 200 that is directed to the solids outlet tube 40 and carries away the removed solid particles. The underflow may carry these solid particles into collection vessel 42 where the level can be controlled by a slide valve (not shown) on conduit 46. When a level of solids is established in collection vessel 42, the underflow vapor can turn back up into the transfer pipe 48.

As shown in FIG. 2, the bottom of the gas-solid separator 200 may be defined by a hemispherical region that is a clean gas chamber 50. A clean gas flows down along the central axes (A-A' in FIG. 1) of cyclones 100 and through purified gas outlets 52 extending below lower tube sheet 36. A clean gas stream is therefore withdrawn from a particle-lean gas outlet 54 in communication with the purified gas outlets 52 of the plurality of cyclones 100. As shown in the particular embodiment illustrated in FIG. 2, clean gas first passes through open-ended cyclone gas outlet tubes 52 to below the lower tube sheet 36 and then into clean gas chamber 50. Lower tube sheet 36 limits communication between clean gas chamber 50 and solids chamber 38. The clean gas stream that is withdrawn through particle-lean gas outlet 54 represents the bulk of the gas stream fed to gas-solid separator 200. The solids concentration of the clean gas is typically less than about 100 mg/Nm$^3$ and often less than about 50 mg/Nm$^3$. A representative gas-solid separator is generally capable of removing essentially all solid (e.g., catalyst) particles having a diameter of 20 microns or greater.

Overall, aspects of the invention are directed to apparatuses and methods for removing solid particles from gas streams, including refining and petrochemical process streams such as gas effluents from fluidized bed processes. Representative process streams include effluents from catalytic reaction zones and/or catalyst regeneration zones of fluid catalytic cracking (FCC) or methanol to olefins (MTO) processes.

In view of the present disclosure, it will be seen that several advantages may be achieved and other advantageous results may be obtained. Those having skill in the art will recognize the applicability of the apparatuses and methods disclosed herein to any of a number of refining, petrochemical, and other processes. Those having skill in the art, with the knowledge gained from the present disclosure, will recognize that various changes could be made in the above apparatuses and processes without departing from the scope of the present invention. Mechanisms used to explain theoretical or observed phenomena or results, shall be interpreted as illustrative only and not limiting in any way the scope of the appended claims.

The invention claimed is:

1. A cyclone for a gas-solid separator, the cyclone comprising
   (a) a barrel;
   (b) a central hub disposed within the barrel to provide an annular section between the central hub and the barrel, wherein the central hub has a lower, tapered section in the form of a conical end cap; and
   (c) swirl vanes extending radially into in the annular section over an axial length of at most about 75% of an axial length of the central hub.

2. The cyclone of claim 1, wherein the axial length over which the swirl vanes extend into the annular section is at most about 50% of the axial length of the central hub.

3. The cyclone of claim 1, wherein the axial length over which the swirl vanes extend is in an upper half of the axial length of the central hub.

4. The cyclone of claim 1, wherein the central hub has an upper, non-tapered section.

5. The cyclone of claim 4, wherein the upper, non-tapered section is cylindrical.

6. The cyclone of claim 5, wherein the upper, non-tapered section of the central hub is disposed concentrically within the barrel.

7. The cyclone of claim 4, wherein the swirl vanes extend over all or a portion of the axial length of the non-tapered section and not over any portion of the axial length of the tapered section.

8. The cyclone of claim 1, wherein the swirl veins are helical.

9. A gas-solid separator comprising an upper tube sheet, a lower tube sheet, and at least one cyclone extending through the tube sheets, the cyclone comprising an impure gas inlet at an upper end of a barrel above the upper tube sheet, a solid particle outlet at a lower end of the barrel between the upper tube sheet and the lower tube sheet, and a purified gas outlet below the lower tube sheet, wherein the cyclone further comprises
   (a) a barrel;
   (b) a central hub disposed within the barrel to provide an annular section between the central hub and the barrel; and
   (c) swirl vanes extending radially into in the annular section over an axial length of at most about 75% of an axial length of the central hub.

10. The gas-solid separator of claim 9, wherein the solid particle outlet is at a radial periphery of the barrel.

11. The gas-solid separator of claim 10, wherein the purified gas outlet is concentric with the barrel.

12. The gas-solid separator of claim 9, comprising a plurality of cyclones, each comprising an impure gas inlet at an upper end of a barrel above the upper tube sheet, a solid particle outlet at a lower end of the barrel between the upper tube sheet and the lower tube sheet, and a purified gas outlet below the lower tube sheet, each cyclone further comprising
   (a) a barrel;
   (b) a central hub disposed within the barrel to provide an annular section between the central hub and the barrel; and
   (c) swirl vanes extending radially into in the annular section over an axial length of at most about 75% of an axial length of the central hub.

13. The gas-solid separator of claim 12, wherein the plurality of cyclones number from about 5 to about 300 cyclones.

14. The gas-solid separator of claim 12, further comprising a process gas inlet in communication with the impure gas inlets of the plurality of cyclones.

15. The gas-solid separator of claim 14, further comprising a particle-rich gas outlet in communication with the solid particle outlets of the plurality of cyclones.

16. The gas-solid separator of claim 15, further comprising a particle-lean gas outlet in communication with the purified gas outlets of the plurality of cyclones.

17. A process for purifying a gas stream contaminated with solid particles, the process comprising:
   (a) feeding the gas stream to a process gas inlet of the gas-solid separator of claim 13, wherein the process gas inlet is in communication with the impure gas inlets of the plurality of cyclones;
   (b) withdrawing an underflow gas stream from a particle-rich gas outlet in communication with the solid particle outlets of the plurality of cyclones; and
   (c) withdrawing a clean gas stream from a particle-lean gas outlet in communication with the purified gas outlets of the plurality of cyclones.

18. The process of claim 17, wherein the gas stream is an effluent from a catalytic reactor or a catalyst regenerator of a fluid catalytic cracking (FCC) process.

19. The process of claim 17 wherein the gas stream is an effluent from a catalytic reactor or a catalyst regenerator of a methanol to olefins (MTO) process.

* * * * *